Dec. 15, 1970   A. H. JONES ET AL   3,546,886
SOIL TREATING APPARATUS

Filed May 11, 1965   7 Sheets-Sheet 1

INVENTORS.
ARTHUR H. JONES
KENNEDY R. FLEMING

BY Burns, Doane, Benedict, Swecker, & Mathis
ATTORNEYS.

INVENTORS.
ARTHUR H. JONES
KENNEDY R. FLEMING

BY Burns, Doane, Benedict, Swecker & Mathis

ATTORNEYS.

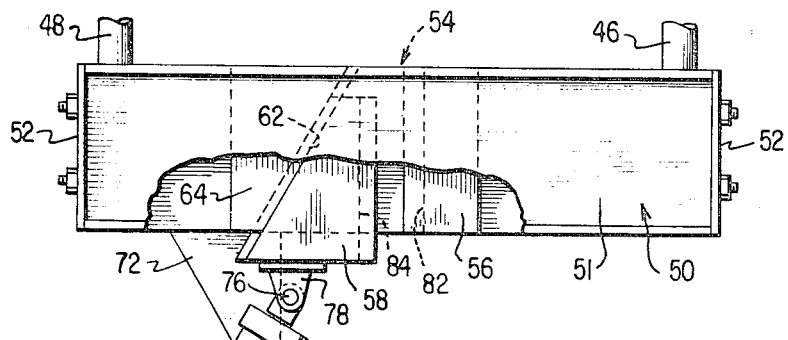
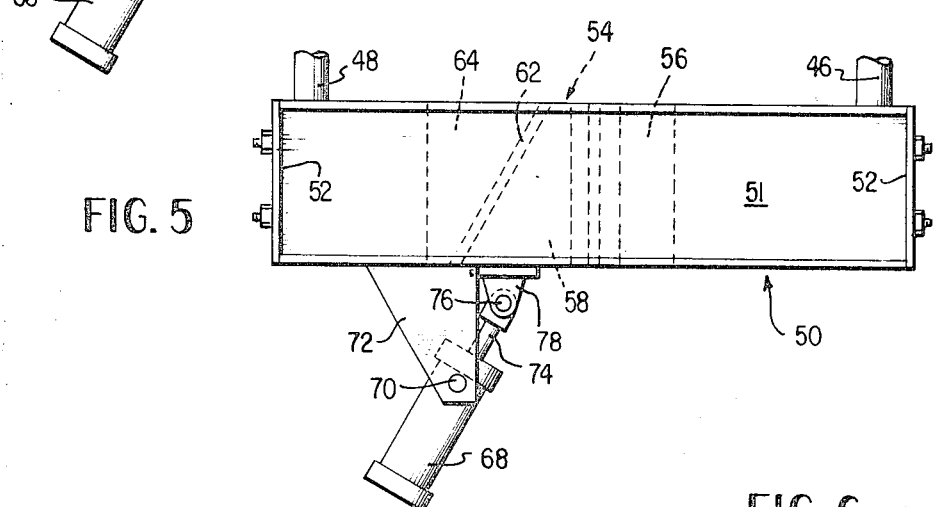
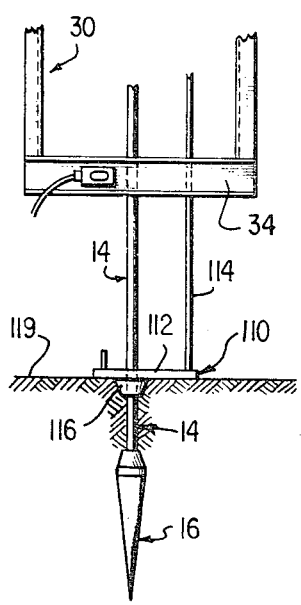
FIG. 4
FIG. 5
FIG. 6
FIG. 7
INVENTORS
ARTHUR H. JONES
KENNEDY R. FLEMING
ATTORNEYS

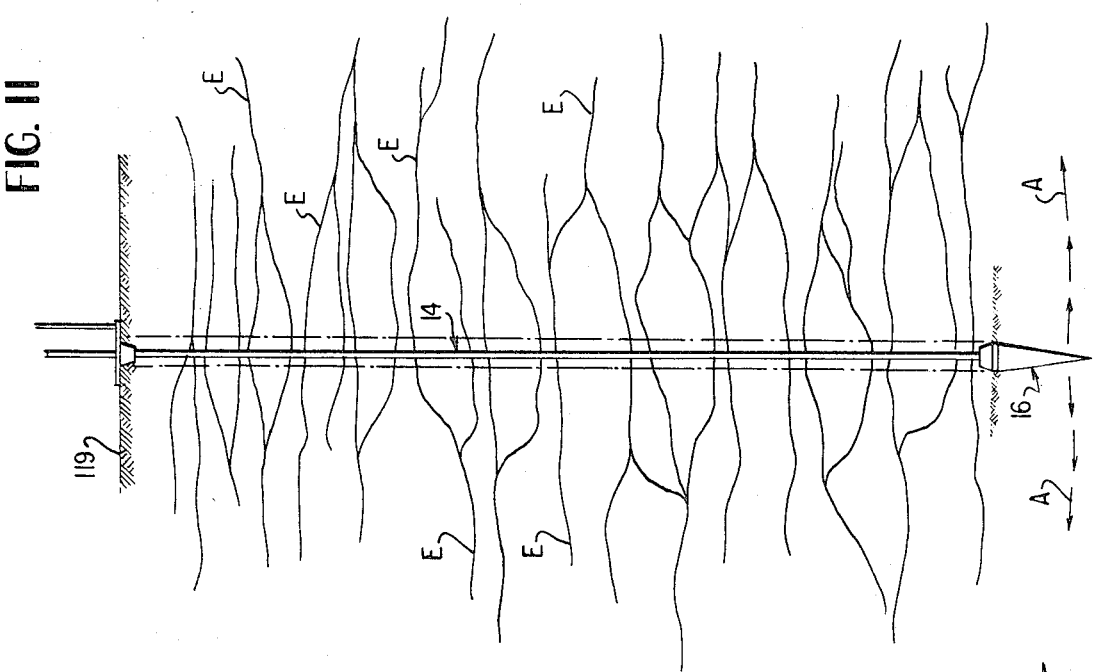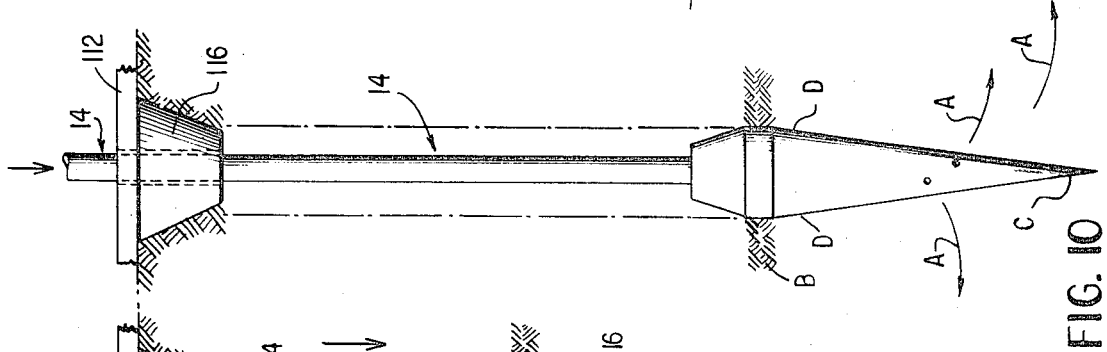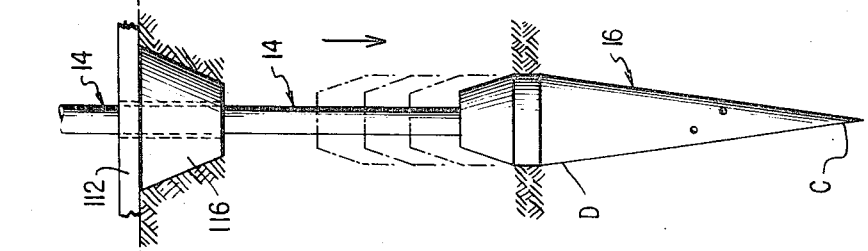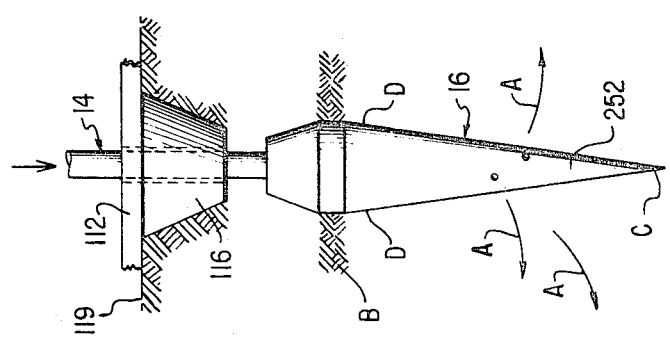
INVENTORS,
ARTHUR H. JONES
KENNEDY R. FLEMING
BY Burns, Doane, Benedict, Swecker, & Mathis
ATTORNEYS

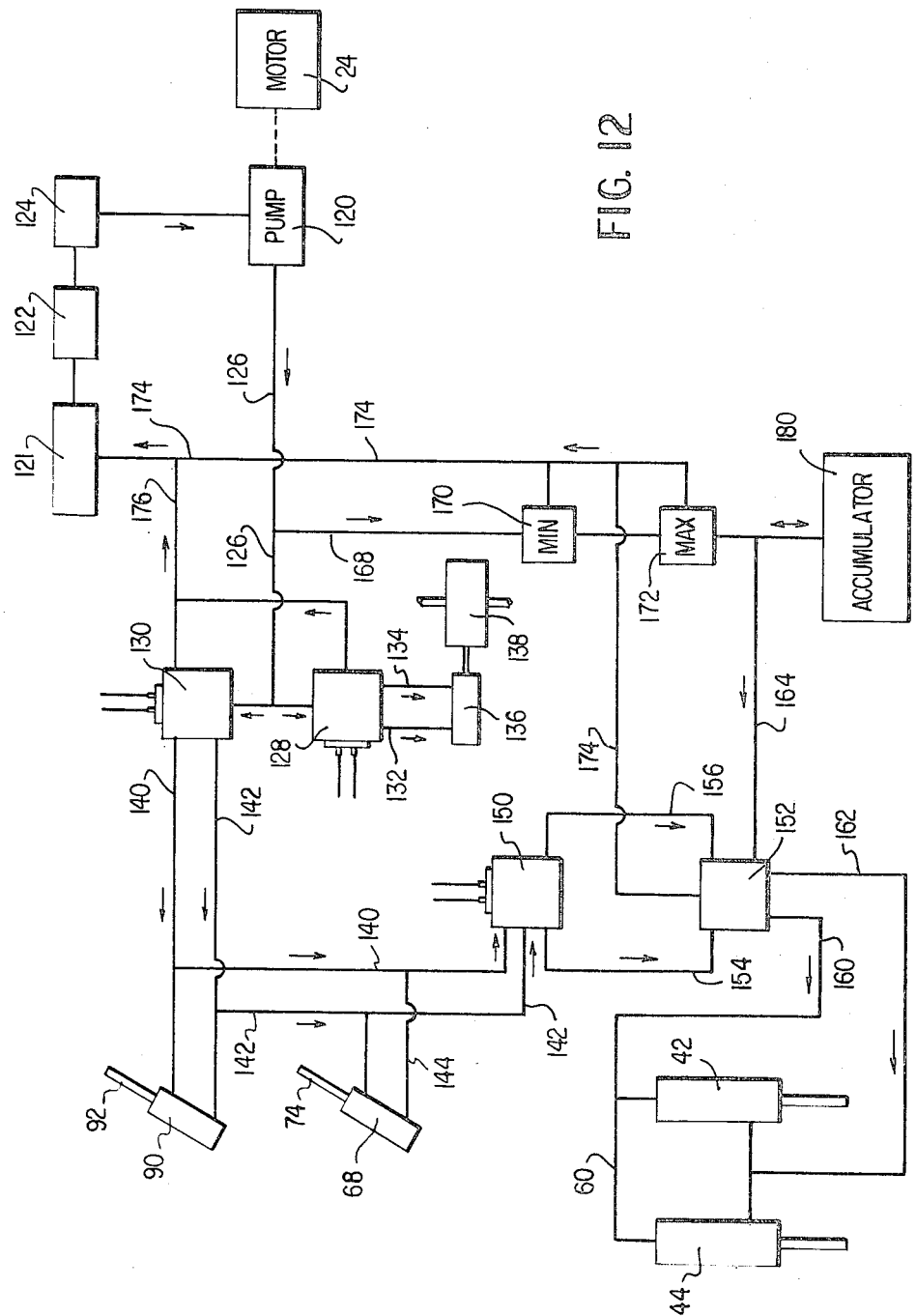

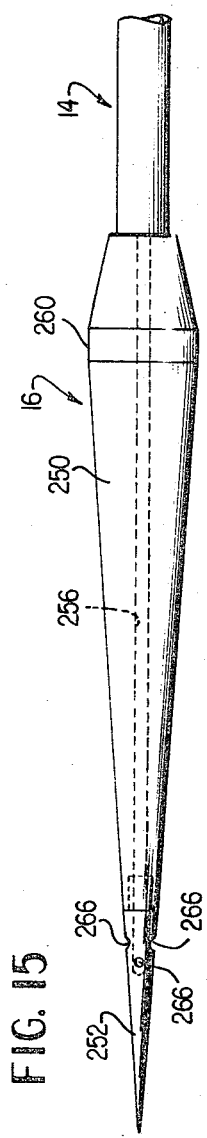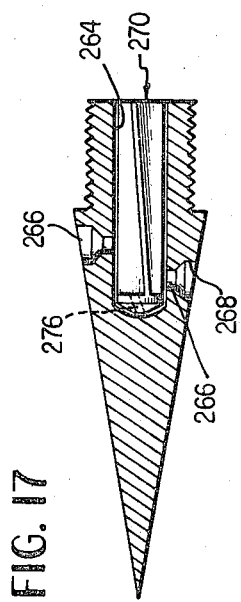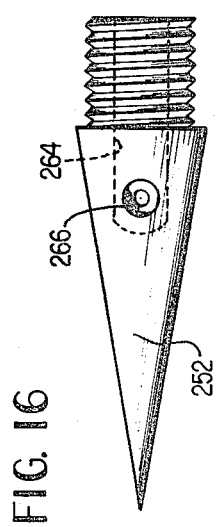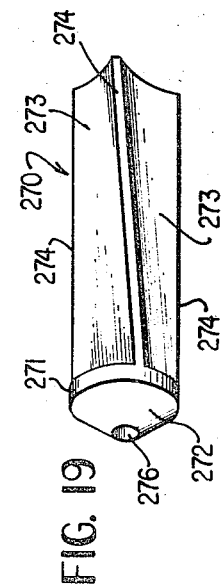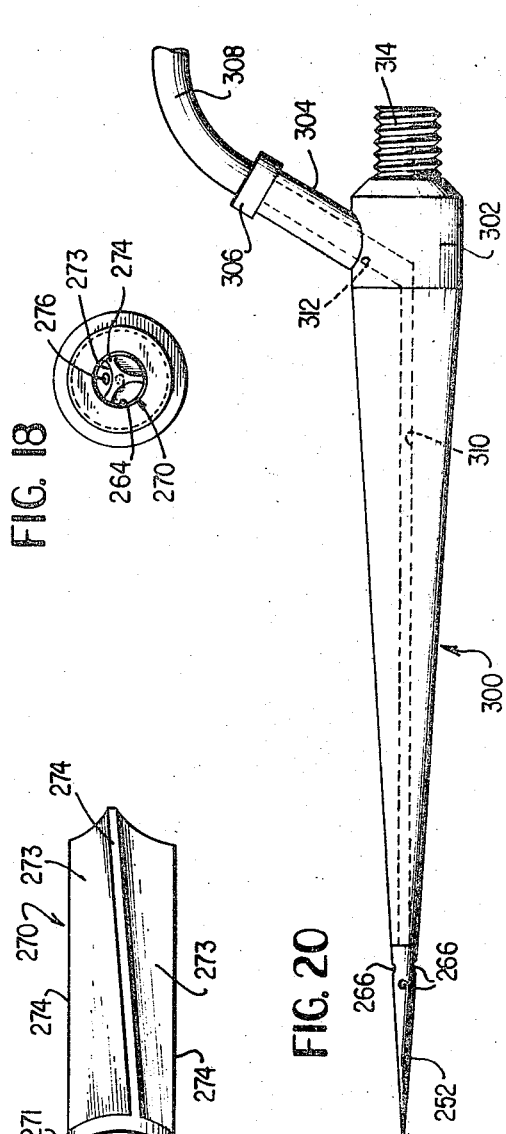

United States Patent Office 3,546,886
Patented Dec. 15, 1970

3,546,886
SOIL TREATING APPARATUS
Arthur H. Jones and Kennedy R. Fleming, Baton Rouge, La., assignors, by direct and mesne assignments, to Soil Treatment and Research Corporation, Baton Rouge, La., a corporation of Louisiana
Filed May 11, 1965, Ser. No. 454,792
Int. Cl. E02d 3/12; A01g 29/00
U.S. Cl. 61—63                                          4 Claims

ABSTRACT OF THE DISCLOSURE

An injector point for use in soil impregnating apparatus which includes a main body portion having a generally conical configuration, with the ration of the length to diameter of the cone shape being about 8 to 1. The injector point provides conduit means terminating in port means at the tip area of the conically shaped injector point.

A method of injecting fluid into soil includes advancing an injector pipe having a bulged injector point intermittently into the soil. Fluid ejection is stopped whenever the injector pipe is moving to avoid lubrication of the injector point which would reduce the effectiveness of the seal formed by the bulged portion of the injector with adjacent compacted soil during the next injection period. A second seal is also maintained about the pipe at the soil surface to avoid fluid loss.

---

This invention relates to a method and to apparatus for treating soil in-situ in order to stabilize the soil and to otherwise improve its physical characteristics.

For some time there has been sought means for effectively treating particular types of soils having high plasticity indices, high clay contents, and considerable mobility or shifting under loads. It has been recognized that lime may be used successfully for stabilizing particular types of soils. Studies have shown that the placing of lime in the soil can lower the plastic index of certain soils and increase the effective grain size, which in turn increases the strength of the soil, forms a good working table, and in effect, gives stability to the soil. However, there has existed a need for an acceptable way of applying lime to soils. To be effective, lime must be applied to considerable depths and under controlled conditions.

One attempt to use lime to stabilize soils has employed the extensive manipulation of the soil. This involves churning and mixing of the soil with lime. Such an approach has proved to be almost prohibitive because the depth to which the soil may be manipulated is limited as a practical matter, and the entire operation has proved extremely expensive.

Another approach has been to bore several holes at close intervals, followed by the filling of hte holes with a lime slurry and relying on the normal movement of free water in the soil to carry the lime into the soil away from the holes. Tests conducted on this method have been discouraging and have shown a lack of movement of the lime into the soil in many cases.

Another attempt to treat soil with a lime has included the use of massive equipment for injecting a lime slurry under pressure into the soil. The equipment used for this has proved extremely difficult to maneuver, and the equipment has not been able to treat large areas of soil in an effective manner. Similarly, hand manipulated equipment has been tried, and while it is useful, it is effective only for treating soil to shallow depths. In the past, the equipment proposed for injecting a slurry under pressure into the soil has encountered additional drawbacks including the leakage or seepage of the slurry to the surface along the pipe used for injecting the slurry.

One object of this invention is to provide a method for treating soil to considerably great depths with a lime slurry and to treat large areas in a rapid and controlled manner. Another object of this invention is to provide mobile self-contained apparatus mountable on a truck or trailer for treating soil with a lime slurry, which apparatus overcomes drawbacks previously encountered.

This is accomplished by providing apparatus capable of inserting into the ground an injector pipe through which lime slurry may be pumped under pressure. The apparatus includes an integrated hydraulic system, a slurry system, and an electrical system coordinated in such a manner as to inject the pipe into the soil in step-by-step fashion and to pump slurry under pressure at timed intervals into the soil. The pipe is forced physically into the soil by an injector and an extraction mechanism including a reciprocating bar connectable with the pipe. Movement of the bar is coordinated with the pumping of the slurry through the pipe.

During one injection operation, the soil may be treated from a point immediately below the surface to an extended predetermined depth. After the pipe has been inserted to the predetermined depth, it is extracted by reverse operation of the injector and extraction mechanism. All of the apparatus is mounted on a vehicle which can be moved from point to point where an injection operation is to be performed.

The lower end of the pipe is equipped with an injector point having a long, slender cone portion terminating in a sharp tip at its lower end. The upper end of the injector point has a comparatively short cylindrical portion with the top of the injector point being cone-shaped with the small end up. The angle of the upper cone portion is considerably flatter than the angle of the cone forming the lower part of the injector point. Slurry leaves the injector point through a series of ports in the tip. A spinner member inside the injector point rotates due to the action of the flow of the slurry to prevent clogging of the ports and to otherwise enhance the flow of the slurry out of the ports during an injection operation.

A surface seal assembly provides a seal on the surface of the soil and includes a horizontally disposed plate with a cone-shaped seal member beneath the plate having a hole therethrough slidably receiving the injector pipe. The small end of the seal member is down. The surface seal assembly, due to gravity, follows the injector point as it enters the soil until the plate rests firmly on the surface of the soil.

As will be explained in detail below, a seal between the injector point and the soil is created due to the particular construction of the point and the time sequence between the downward movement of the injector point and the injection of the slurry into the soil. The seal provided prevents the slurry, which is injected under considerable pressure, from traveling upwardly along the injector pipe to the surface at the area where the injector point entered.

The apparatus of this invention and diagrammatic illustrations representing the method of this invention are included in the accompanying drawings, in which:

FIGS. 4 and 5 are rear elevation views of the bar assembly of the pipe injector and extraction mechanism showing the pipe gripper assembly in different positions;

FIG. 6 is a plan view corresponding with FIG. 5;

FIG. 7 is a rear elevation view showing the surface seal assembly;

FIGS. 8, 9 and 10 are elevation views of the injector point and other structure, representing different phases in an injection operation as the injector pipe moves downwardly through the soil;

FIG. 11 is a diagrammatic elevation view showing the injector point after it has been inserted into the soil to a considerable depth and illustrating the flow of slurry through the soil;

FIG. 12 is a schematic diagram of the hydraulic system;

FIG. 15 is an enlarged view of an injector point;

FIG. 16 is an enlarged view of the tip portion of the injector point;

FIG. 17 is a cross-sectional view of the tip shown in FIG. 16;

FIG. 18 is an end view of the tip shown in FIG. 16;

FIG. 19 is a perspective view of a spinner member for the tip of the injector point; and FIG. 20 is an enlarged view of a modified form of injector point.

Figure 1:
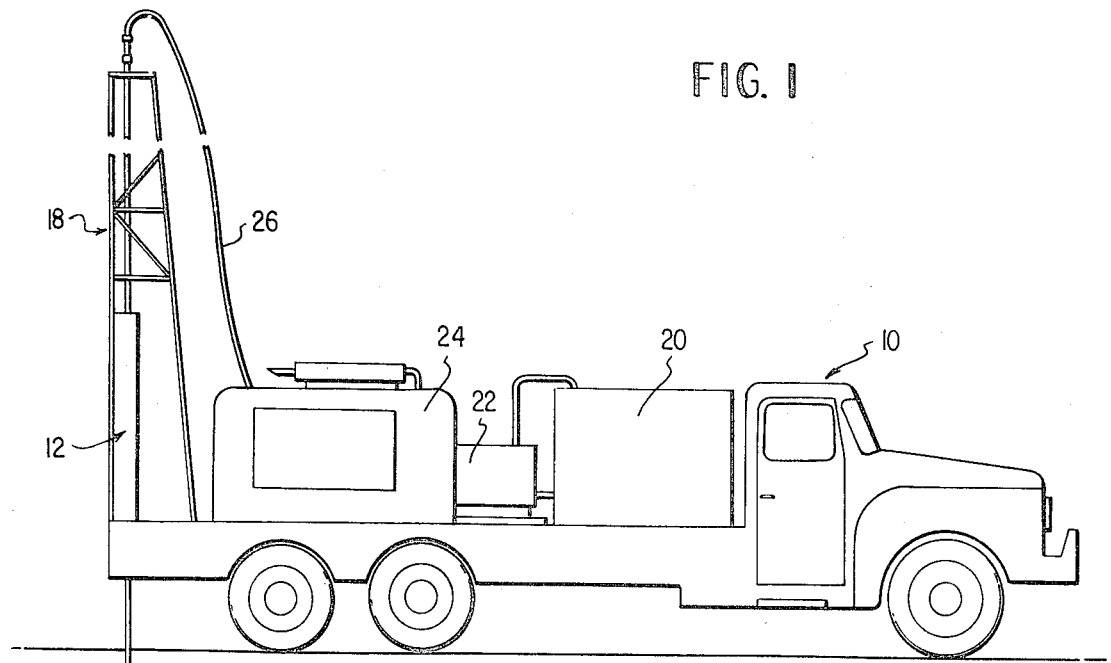
FIG. 1 is a side elevation view of a vehicle showing diagrammatically portions of the apparatus of this invention mounted thereon.

The apparatus of this invention is mounted on a vehicle 10 illustrated diagrammatically in FIG. 1. A pipe injector and extraction mechanism 12 is shown as being mounted on the rear of the vehicle. It could, however, be positioned at another location on the vehicle. An injector pipe 14 with an injector point 16 is supported at the rear of the vehicle by a derrick-like structure 18 which extends upwardly above the pipe injector and extraction mechanism. The derrick structure 18 may be made collapsible or removable for ease of transportation when the apparatus is not in use.

The slurry injection apparatus illustrated in FIG. 1 includes a slurry reservoir 20, a slurry pump 22 driven by a motor 24, and a flexible slurry supply line 26 leading to the upper end of the injector pipe 14. Additional slurry injection apparatus is shown in detail in other figures. While the apparatus in FIG. 1 is shown as being mounted on the bed of a truck, the apparatus could be mounted on a trailer or other mobile vehicle as well.

The pipe injector and extraction mechanism 12 is illustrated in detail in FIGS. 2 through 6. A vertically extending frame 30 mounted on the rear of the vehicle 10 includes side members 32 fixed to a lower member 34 and an upper member 36 which may be constructed of channel-shaped members spaced apart back-to-back. A lower cross member 38 and an upper cross member 40 serve to strengthen the frame 30 and to provide support for apparatus to be described. For the sake of clarity, portions of the apparatus have been omitted from FIGS. 2 and 3.

A pair of double-acting, hydraulically actuated cylinders 42 and 44 are fixed to the frame 30 as by being bolted or strapped to the upper member 36 and the lower cross member 38. The piston rods 46 and 48 thereof extend downwardly and are connected with a bar assembly 50 which is free to move upwardly and downwardly upon actuation of the cylinders 42 and 44. The bar assembly 50 may be constructed of channel-shaped members 51 spaced apart back-to-back with the piston rods 46 and 48 fixed by means of U-bolts 53 to plates 52 connecting the opposite ends of the channel-shaped members 51.

A lower injector pipe gripper assembly 54 is mounted between the channel members 51 of the bar assembly 50 and includes a first jaw member 56 fixed to the channel members 51 against movement with respect thereto and a movable jaw member 58 having a dovetail shaped guide 60 slidably received by a correspondingly dovetail shaped guideway 62 in a block 64 which is fixed against movement between the channel members 51. A double-acting, hydraulically actuated cylinder 68 is pivotally supported at 70 between a pair of brackets 72 depending from corresponding channel members 51. The piston rod 74 of the cylinder 68 is pivotally connected at 76 to a pair of brackets 78 fixed to the bottom of the movable jaw 58.

When the cylinder 68 is actuated to retract the piston rod 74, the movable jaw 58 is moved downwardly to the position shown in FIG. 4; and when the cylinder 68 is actuated to extend the piston rod 74, the movable jaw 58 is moved upwardly to the position shown in FIG. 5. Movement of the movable jaw 58 is guided by the dovetail guide 60 sliding in the dovetail guideway 62. Upward movement of the movable jaw 58 causes the jaw to move horizontally toward the fixed jaw 56 due to the angular relationship of the dovetail guide 60 and dovetail guideway 62 with respect to the fixed jaw 56. The jaw 56 and the jaw 58 have cooperating vertically extending grooves 82 and 84 which receive the injector pipe 14. When the movable jaw 58 is closed, that is moved upwardly, the injector pipe 14 is gripped between the jaws 56 and 58. This, in turn, connects the bar assembly 50 to the pipe. Conversely, when the movable jaw 58 is opened, that is moved downwardly, the injector pipe 14 is released, and the bar assembly 50 is free to move with respect to the injector pipe 14.

An upper injector pipe gripper assembly 86, similar to lower gripper assembly 54, is mounted between the channel members of the upper member 36 of the frame 30 and includes a double-acting, hydraulically actuated cylinder 90, the piston rod 92 of which moves a movable jaw member 94 toward and away from a fixed jaw member 96. A dovetail connection at 98 between the movable jaw 94 and a fixed block member 100 imparts horizontal movement to the movable jaw member 94 for gripping the injector pipe 14 between the movable jaw 94 and the fixed jaw 96 in the same maner that the injector pipe 14 is gripped between the movable jaw 58 and the fixed jaw 56 of the lower gripper assembly 54.

The injector pipe 14 extends vertically through both pairs of jaws 56–58 and 94–96. Above the injector and extraction mechanism 12, the injector pipe 14 is supported by suitable guides on the derrick structure 18. The injector point 16 is forced downwardly into the soil for an injection operation or is pulled out of the soil by the injector and extraction mechanism 12 at the time the bar assembly is actuated with lower gripper assembly 54 closed.

Figure 2:
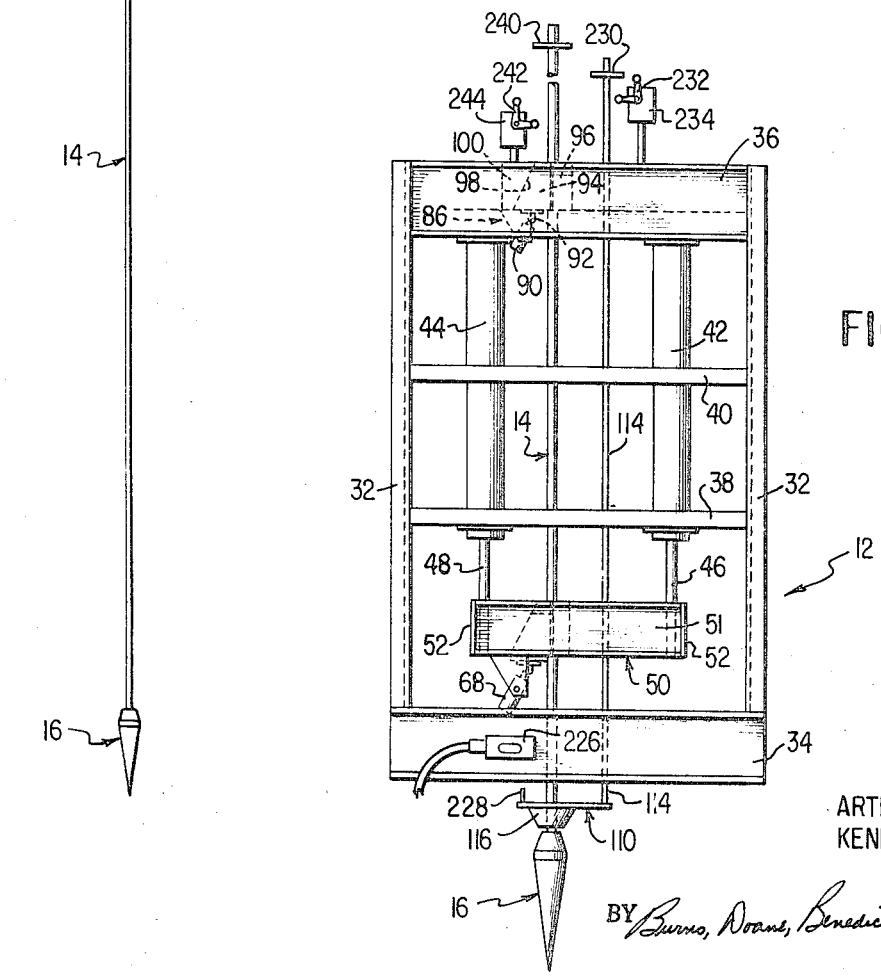
FIG. 2 is an enlarged rear elevation view showing portions of the pipe injector and extraction mechanism.
Figure 3:
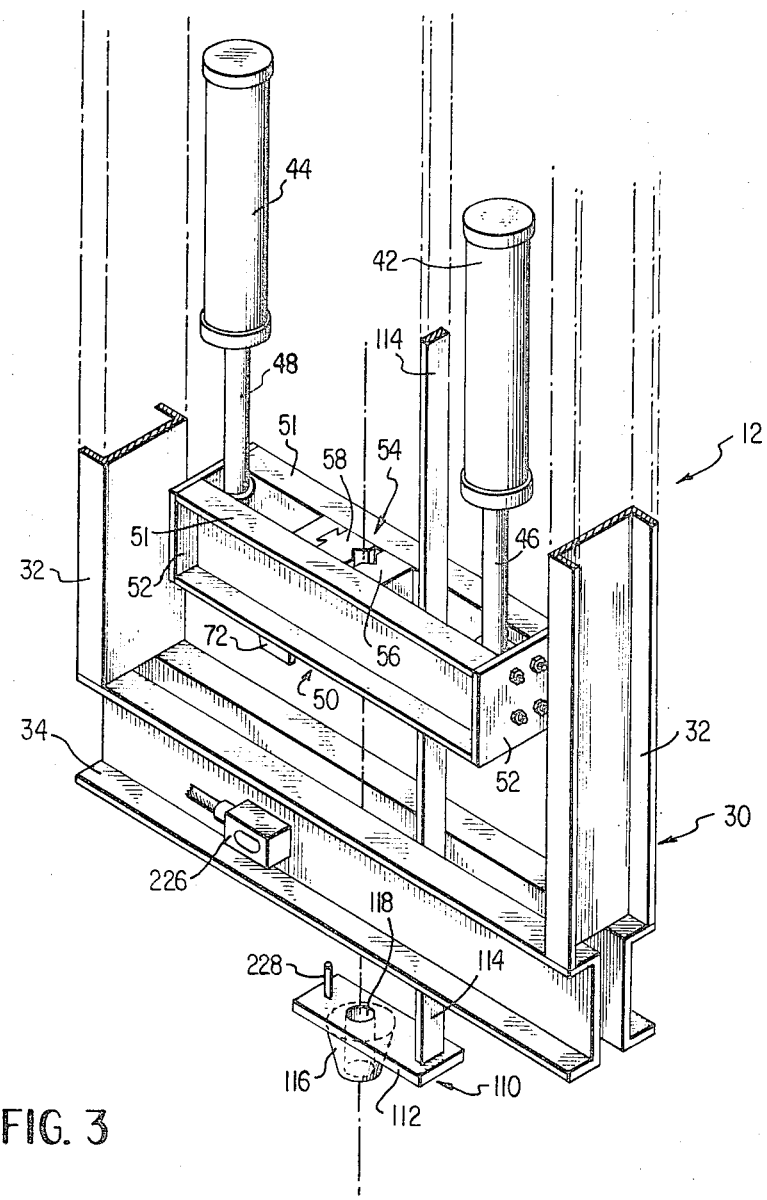
FIG. 3 is a fragmentary rear elevation perspective view of portions of the structure shown in FIG. 2.

A surface seal assembly 110 associated with the injector pipe 14 includes a horizontally disposed plate 112 to which is connected a vertically extending rod 114 supported for vertical movement by suitable guides on the frame 30. A cone-shaped seal element 116 is mounted to the bottom of the plate 112 with the small end down and has a hole 118 therethrough loosely receiving the injector pipe 14. The surface seal assembly 110 is free to move upwardly and downwardly depending upon the position of the injector point 16 which bears against the bottom of the seal element 116 and which can pull the surface seal assembly 110 upwardly when the injector pipe 14 is extracted as shown in FIG. 2.

When the injector pipe 14 is forced downwardly into the soil, the surface seal assembly 110 is free to fall downwardly until the plate 112 rests on the surface 119 of the ground as shown in FIG. 7. The weight of the surface seal assembly 110 causes the seal element 116 to snugly fit into the soil loosened by the insertion of the injector point 16. The plate 112 and the seal element 116 serve to seal off the disturbed soil at the surface and limit or prevent slurry from flowing to the surface when slurry is forced out of the injector point 16 at the time the injector point 16 is immediately below the surface.

The hydraulic system is illustrated diagrammatically in FIG. 12. The motor 24, which may be a diesel engine, for example, drives a hydraulic pump 120 which supplies hydraulic fluid under pressure for the hydraulic system. The pump 120 receives hydraulic fluid from a main reservoir 121 through a filter 122 and a smaller reservoir 124. Hydraulic fluid under pressure is supplied from the pump 120 through a main supply line 126 to electricaly controlled hydraulic valves 128 and 130. The valve 128 may be actuated electrically to allow fluid under pressure to pass through either line 132 or line 134 to a double-acting, hydraulically actuated cylinder 136 which controls a three-way valve 138 in the slurry system, the operation of which will be explained.

The valve 130 may be actuated electrically to allow fluid under pressure to pass into either line 140 or line 142 which in turn controls the operation of the double-acting, hydraulically actuated cylinders 68 and 90 of the upper and lower injector pipe 14 gripper assemblies 54 and 86. Fluid under pressure through line 140 passes through branch line 144 to the rear of the cylinder 68 to extend the piston rod 74 causing the lower gripper assembly 54 to grip the injector pipe 14. At the same time, fluid through line 140 enters the cylinder 90 causing the piston rod 92 to retract, thereby opening the upper gripper assembly 86.

The valve 130 may be actuated electrically to allow fluid under pressure to flow through line 142 to enter the front of the cylinder 68 to retract the piston rod 74, opening the lower gripper assembly 54 and to enter the rear of the cylinder 90 to extend the piston rod 92 to cause the upper gripper assembly 86 to grip the injector pipe 14. When the lower gripper assembly 54 grips the injector pipe, the upper gripper assembly 86 is released and, conversely, when the lower gripper assembly 54 is released, the upper gripper assembly 86 grips the injector pipe 14. This is under control of the electrically actuated valve 130.

Fluid under pressure from lines 140 and 142 passes to an electrically controlled valve 150 which in turn controls the flow of hydraulic fluid to a valve 152. The valve 150 can be actuated electrically to allow fluid pressure to flow either through line 154 or line 156 which controls the flow of hydraulic fluid through either line 160 or line 162 to either end of the hydraulically actuated cylinders 42 and 44 for raising and lowering the bar assembly 50. The valve 152 receives fluid under pressure from line 164 and by selective control of the valve 152, this fluid from line 164 is caused to flow through either line 160 or line 162.

Fluid from the main supply line 126 passes through a branch line 168 to a minimum pressure valve 170 and a maximum pressure valve 172 both of which can be adjusted for regulating, respectively, the minimum and maximum pressure in line 164 for actuation of the cylinders 42 and 44. For example, if the injector point 16 is to be inserted into heavily compacted or dense soil, the pressure available for inserting the injector pipe 14 can be increased sufficiently by adjusting the maximum pressure valve 172 to the point where the apparatus will operate smoothly. Line 174 returns hydraulic fluid to the main reservoir 20, as does line 176.

An accumulator 180 is provided for receiving and storing fluid under pressure from the maximum pressure valve 172. This assures that sufficient fluid pressure will be available during a downward stroke of the bar assembly 50 for pushing the injector pipe 14 into the soil.

The hydraulic system illustrated diagrammatically in FIG. 12 is operated in such a fashion as to cause the injector pipe 14 to be inserted into the ground in step-by-step fashion. The bar assembly 50 is caused to reciprocate upwardly and downwardly by the cylinders 42 and 44 which operate together to cause substantially equal force to be applied to opposite ends of the bar assembly 50. For example, in order to insert the injector pipe 14 into the soil, the lower gripper assembly 54 is released and the bar assembly 50 is raised by actuation of the cylinders 42 and 44. With the bar assembly 50 raised, the lower gripper assembly 54 is closed by actuation of the cylinder 68 and the upper gripper assembly 86 is released by actuation of the cylinder 90. The cylinders 42 and 44 are then actuated to cause a downward stroke of the bar assembly 50, which in turn forces the injector pipe 14 and the injector point 16 into the soil. The surface seal assembly 110 moves downwardly under the force of gravity since there is nothing for retaining the assembly in a retracted position. After the bar assembly 50 reaches the extreme downward position, the upper gripper assembly 86 is closed by actuation of the cylinder 90 and the lower gripper assembly 54 is released by actuation of the cylinder 68. Cylinders 42 and 44 are then actuated to raise the bar assembly 50 to its extreme upward position. The lower gripper assembly 54 is then closed and the upper gripper assembly 86 is opened, and another downward stroke of the bar assembly 50 is made to force the injector pipe 14 and the injector point 16 into the soil a distance corresponding to the stroke of the bar assembly. This action is repeated until the injector point 16 is inserted into the soil to the desired depth. The step-by-step operation of the insertion of the injector point 16 is coordinated with the flow of the soil treating slurry.

Figure 13:
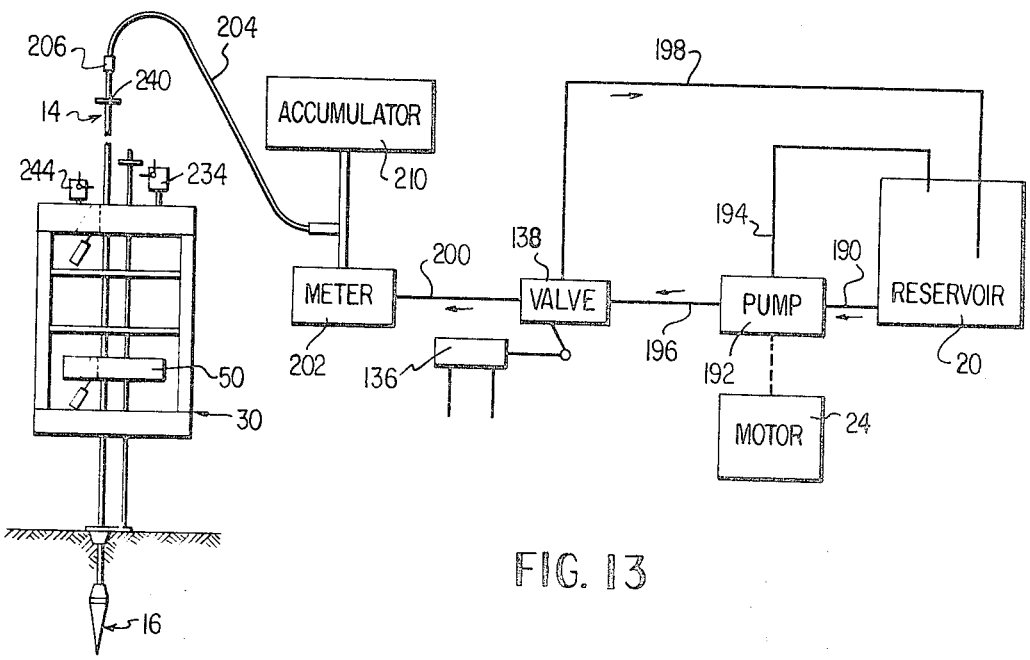
FIG. 13 is a schematic diagram of the slurry system.

The slurry system is illustrated diagrammatically in FIG. 13. Slurry from the reservoir 20 is supplied to a slurry pump 190 driven by the motor 24. A return line 194 is provided for returning slurry from the pump 192 to the reservoir 20. Slurry under pressure from the pump 192 passes through a supply line 196 to the three-way valve 138 which is under control of the hydraulically actuated cylinder 136 described previously in connection with the hydraulic system. A return line 198 is provided for returning slurry from the valve 138 to the reservoir 20. When the valve 138 is opened in response to actuation of the cylinder 136, slurry under pressure passes through line 200, through a slurry meter 202, into a flexible conduit 204, which is connected at 206 to the top of the injector pipe 14. An accumulator 210 is provided for receiving and storing slurry under pressure and can be adjusted for providing sufficiently large amounts of slurry under pressure as desired, depending upon soil conditions. For example, if extremely compacted soil is encountered, the accumulator 210 would be adjusted to a high slurry pressure, thereby making more effective the injection of the slurry into the soil so that slurry will reach locations remote from the injector point 16 during a slurry injector operation.

Figure 14:
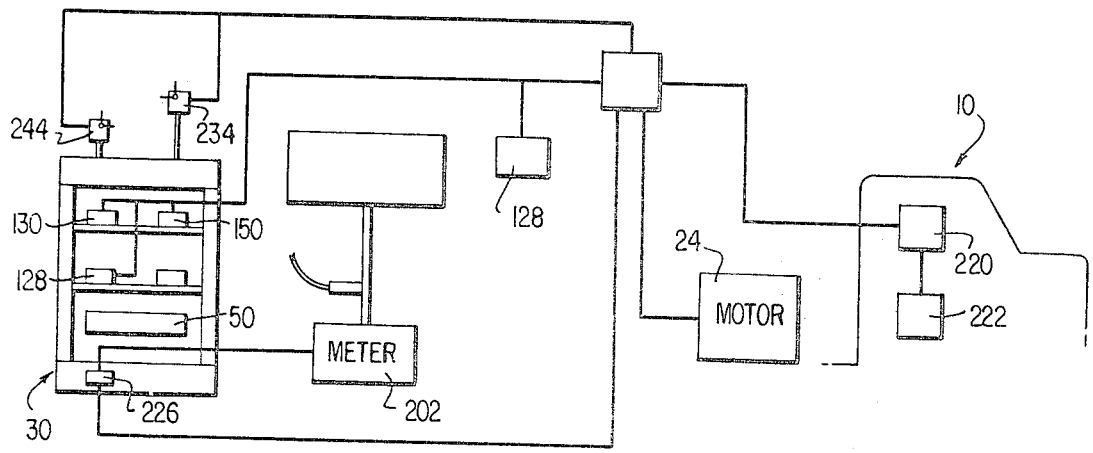
FIG. 14 is a schematic diagram of the electrical system.

The electrical system is illustrated diagrammatically in FIG. 14 and is not intended to be a complete electrical layout. A master control box 220 is on the vehicle 10 and is under primary control of a hand switch 222. The master control box contains the necessary electrical apparatus for automatic operation of the system as described. The hand switch 222 may control the speed of the motor 24. A source of electrical power may be provided by a battery (not illustrated).

A switch 226 on the frame 30 is actuated by an extension 228 (FIG. 2) on the plate 112 of the surface seal assembly 110. When the injector pipe 114 is retracted to pull the injector point 16 upwardly, the surface seal assembly 110 in turn is pulled upwardly to a position where the extension 228 actuates the switch 226. This opens the electrical circuit through the master control box 222 and shuts off the hydraulic system and the slurry system. When an injection operation is to begin, the hand switch 20 is actuated to start the injection apparatus. Operation of the hydraulic system to cause the first downward stroke of the bar assembly 50 and in turn downward movement of the injector pipe 14, as described, allows the surface seal assembly 110 and the rod 114 to move downwardly. An arm 230 (FIG. 2) is fixed to the top of the rod 114 of the surface seal assembly 110. A double switch lever 232 of a switch 234 is in the path of the arm 230. When the rod 114 moves downwardly, the arm 230 falls on the lever 232 of the switch 234 to actuate the electrically operated hydraulic valve 128 to in turn open the three-way slurry valve 138. During the continuation of the injection operation, the arm 230 will remain below the lever 232 of the switch 234.

The extreme upper end of the injector pipe 14 is provided with an arm 240 similar to the arm 230 for engagement with a double switch lever 242 of a switch 244. After the injector pipe 14 has been inserted to its maximum predetermined depth, arm 240 will engage the lever 242 to actuate the switch 244 to shut off the three-way slurry valve 138 and to reverse the pipe injector and extraction mechanism to extract the injector pipe 14 automatically. The location of the arm 240 on the injector pipe 14 can be changed to vary the depth the injector pipe will be inserted automatically before extraction of the injector pipe begins.

For control of the amount of slurry to be pumped into the soil during an injection operation, the slurry meter 202 is connected electrically with the valve 150 which controls the flow of hydraulic fluid to the cylinders 42 and 44. After a predetermined volume of slurry has been injected into the soil from the accumulator 210 through the conduit 204 as determined by the meter 202, the valve 150 is actuated to in turn actuate the cylinders 42 and 44 to force the bar assembly 50 downwardly and the injector point 16 to a new depth. During each downward stroke of the bar assembly 50 to push the injector point 16 downwardly, the accumulator 210 is filled. Slurry is caused to flow from the accumulator 210 and then through the conduit 204 under control of the meter 202 which also actuates the hydraulic valve 128 which in turn actuates the cylinder 136 to regulate the three-way slurry valve 138. The electrical system illustrated is intended to be merely illustrative for the purpose of carrying out the operation of the hydraulic system and the slurry system.

The injector point 16 of this invention is illustrated in detail in FIGS. 15–19. The general configuration of the injector point is shown in FIG. 15 and includes a main body portion 250 terminating at its lower end in a tip portion 252 which is threaded into the main body portion 250. The upper end of the main body portion 250 is threadedly connected with the injector pipe 14. A passage 256 extends longitudinally through the main body portion 250 from the injector pipe 14 to the tip 252. A significant portion of the length of the main body portion 250 extends in relatively long, slender cone shape, with the angle between the longitudinal axis of the main body portion and the exterior cone surface being relatively small as illustrated in FIG. 15. The tip 252 completes the point of the cone. The upper portion of the injection point 16 also is cone-shaped, but having an angle somewhat larger than the angle of the lower cone portion and with the small end up for ease in extraction of the injector point 16 from the soil. A transition portion 260 between the two oppositely disposed cone-shaped ends of the injector point is substantially cylindrical throughout a relatively short distance. Preferably the ratio of the length of the slender lower cone portion of the injector point with the diameter of the main body portion is about eight to one. The corresponding ratio of the upper one portion preferably is about two to one. The ports 266 preferably are located ⅛ the length of cone portion from the tip end of cone, leaving ⅞ of the length of the cone portion above the ports 266. It is significant to have a port or ports only at or near the leading end of the injector point with a substantial cone-shaped body portion extending from the ports opposite the leading end.

The tip 252 of the injector point 16, illustrated in detail in FIGS. 16–19, is provided with a cavity 264 communicating with the passage 256 in the main body portion 250 of the injector point. A series of ports 266 are spaced circumferentially and staggered around the tip 252 at the bottom of the cavity 264. The ports 264 flare into a larger port opening 268 on the outside surface of the tip 252. The specific number of ports may be varied as desired for particular applications of slurry and for different soil conditions.

A spinner member 270 is located within the cavity 264 and has a head 271 with a lower convex end 272 substantially of the same curved planar configuration as the inside end of the cavity 264. Concave sides 273 of the spinner 270 are formed in spiral fashion, as illustrated in FIG. 19, with ribs 274 therebetween disposed at a slight angle with respect to the longitudinal axes of the spinner member. The diameter of the spinner is somewhat smaller than the diameter of the cavity 264, as illustrated in FIGS. 17 and 18. A hole 276 in the center of the convex end 272 extends through the head 271 and comes out adjacent one of the concave sides 273 opposite the convex end 272. The hole 276 allows slurry to pass to the bottom of the cavity 264 to serve as a lubricant between the convex end 272 and the cavity wall.

Slurry under pressure from the passage 256 in the main body portion 250 passes into the cavity 264 and flows over the spirally disposed concave sides 273 of the spinner 270 and causes the spinner to rotate rapidly. The slurry flows through the ports 266 and out the widened port openings 268. Rotation of the spinner serves to keep the cavity 264 clear and prevent coagulation of the slurry. The widened port openings 268 serve to keep the ports open as slurry rushes out, thereby in effect cleansing the port openings of compacted soil which may enter the ports during injection of the injector point 16 through the soil. A spinner such as the spinner 270 may be used at different locations in the conduits forming the slurry system to prevent coagulation and ensure free flow of the slurry. A spinner may be used at the reservoir 20, for example.

For special application of slurry, a modified form of injector point 300 may be used (FIG. 20). The lower cone portion of the injector point 300 is similar to the corresponding portion of the injector point 16, including the tip 252. The transition portion 302 is somewhat modified and includes an extension 304 connected at 306 with a flexible conduit 308 for delivering slurry to the injector point 300. A passage 310 in the injector point communicates with a passage 312 in the transition portion 302 and the extension 304 for carrying slurry from the conduit 308 to the tip 252. A threaded portion 314 is used to connect the injector point 300 to a pipe such as the injector pipe 14 or to a solid rod similar to the pipe 14. The injector pipe 14 or a rod is used with the injection apparatus described previously to force the injector point 300 into the soil. Slurry is pumped to the injector point 300 through the conduit 308 by using the slurry pumping apparatus described previously or by using conventional pumping equipment.

This setup using the modified injector point 300 is particularly useful for treating soil to shallow depths where a relatively high concentration of slurry is desired. Versatility of the injection apparatus is thus obtained by the modified injector point 300.

At a location where an injection operation is to be performed, that is where the injector pipe 14 is to be inserted into the soil, the injector pipe is lowered allowing the plate 112 of the surface seal assembly 110 and the seal members 116 to fall downwardly since there is no provision for holding the plate 112 up other than the injector point 16. Operation of the hydraulic system forces the tip 252 of the injector point 16 into the soil. As the injector point 16 passes downwardly through the soil, it is followed by the seal member 116 which, due to the weight of the plate 112 and the vertically extending rod 114, falls into the hole made by the injector point until the plate 112 rests on the ground surface 119. The plate 112 and the seal member 116 serve to close off the opening in the soil made by the injector point.

In FIG. 8, the injector point 16 is shown as having been inserted into the ground and slurry is being pumped through the injector pipe 14, as represented by arrows A. Slurry passes through a passage 256 in the injector point and out the ports 266 around the lower end of the injector point. In FIG. 9 the injector point 16 is moving downwardly, and in FIG. 10 the injector point 16 is stopped and slurry is being injected into the soil.

The construction of the injector point 16 aids in creating a seal with the soil. Such a seal prevents the slurry from seeking its way to the surface along the injector pipe. The injector point disturbs as little soil as possible during insertion. For example, as the injector point pierces the soil, that portion of the soil below the area designated B will be relatively undisturbed due to the long, slender cone shape of the lower part of the injector point. As this lower part of the injector point pierces the soil, however, it slightly compacts the soil through which it passes. The soil adjacent the extreme lower end of the injector point will be compacted only to a small extent in the area indicated by arrow C. At the area indicated by the arrow D, however, the soil will be compacted to a relatively greater extent than at the area designated by arrow C. The ports 266 are between the areas along the lower part of the injector point representing minimum and maximum compaction of the soil; that is, the soil above the ports 266 toward the area D will be compacted to a greater extent than the soil in the area toward the arrow C below the ports 266.

Consequently, when slurry under pressure is forced out of the ports 266, it will tend to move into and through the less dense soil rather than the more compact soil. The direction in which the slurry will tend to flow, as represented by arrows A, is downward rather than upward. The suggested ratio for the lower cone portion serves to make this compaction feature significant for creating a seal.

Since clay soils are normally in horizontal straitions or layers, there will be considerably less resistance to lateral flow of the slurry, that is horizontal flow, compared with vertical flow. Once the slurry reaches areas remote from the injector point, the horizontal layers of the undisturbed soil will serve to prevent seepage of the slurry in an upward vertical direction. The slurry seeks out the natural passages through the layers of clay and flows generally horizontally, as shown in FIG. 11 at A, and leaves deposits of lime E.

Accordingly, the shape of the injector point and the particular location of the ports 266 in the tip 252 creates a seal along the face of the lower part of the injector point above the ports due to the compaction feature as explained. This seal allows the slurry to be injected to areas remote from the point 2 where it will be forced between the undisturbed horizontal passages in the soil.

The creation of the seal is further enhanced by the selective ejection of the slurry from the ports 266. The slurry is not forced from the injector point while the injector point is moving downwardly, but only when the injector point is stationary, as in FIGS. 8 and 10. This allows the surface of the injector point to engage directly the soil and take advantage of any adhesive characteristics that might be developed between the soil and the surface during the compacting phase while the injector point moves downwardly. By comparison, it can be visualized that if slurry were forced from the injector point during the time the injector point were moving downwardly, the slurry would act as a lubricant and would add moisture to the soil adjacent and along the injector point. This is not the case, however, and slurry is pumped out of the ports 266 only during the time the injector point is not being forced downwardly during the injecting operation.

Furthermore, the slurry immediately upon leaving ports 266 is under considerable pressure. The hydraulic pressure behind the slurry, so to speak, is applied only when the injector point is stationary as explained. The high pressure of the slurry immediately outside the ports 266 tends to push upwardly against the soil immediately above the ports 266 and to force this soil against the conical surface of the injector point which, in effect, hangs over the ports 266. This also assists in creating the seal along the injector point above the ports 266.

The method and apparatus of this invention is extremely effective for applying lime slurry to soil in-situ, without the need to work or substantially disturb the soil. In actual practice, injections have been made up to a depth of twenty feet. Depths considerably greater than this may be obtained, depending upon the design strength of equipment employed. A stroke of the bar assembly 50 and consequently slurry injections at depths eight to ten inches apart have proved entirely satisfactory, although this may be varied. It has been found that forced migration of the slurry for a radius of two feet or more radially of the injector pipe can be obtained easily in most types of highly compacted clay soils. In many instances, considerably greater distances have been achieved. Injections of about one gallon of slurry during each injection phase at the different depths have proved satisfactory for effective treatment of most soils. Again, this may be varied depending on the intended degree of saturation. Loss of slurry due to seepage or return of the slurry to the surface has proved to be negligible. The problem of creating a seal for effective horizontal dispersion of the slurry, which problem exists with prior devices, has been solved.

While only one injection operation has been described, the practical use of the method and apparatus of this invention includes the effecting of a series of continuous injection operations at predetermined locations of about five feet apart for good coverage, but angular injections can the pipe has been described, but angular injections can be made as well.

The invention as specifically shown and described is presented for purposes of disclosure, and such changes may be made as come within the scope of the following claims.

We claim:

1. An injector point for insertion into soil to dispense a fluid into soil, said injector point comprising a main body portion of general cone-shape configuration, the ratio of length to diameter of the cone-shape being about eight to one, said injector point providing conduit means therethrough terminating in port means at the tip of the cone-shape, the larger diameter portion of the cone-shape adapted to serve as a seal between the injector point and soil when the injector point is inserted into soil.

2. The injector point as defined in claim 1 wherein said conduit means includes an elongated cavity adjacent the tip of the cone-shape, said port means communicating with the end of the cavity toward the tip of the cone-shape, and means in said cavity for assisting in the dispensing of fluid from the injector point.

3. The injector point as defined in claim 2 wherein said means for assisting in the dispensing of fluid comprises an elongated member adapted to be rotated upon the flow of a fluid through the conduit means into said cavity.

4. Apparatus for treating soil in situ comprising a vehicle, an injector pipe adapted to be inserted generally downwardly into the soil to be treated without substantially disturbing the soil, said injector pipe providing conduit means therethrough terminating at the end to be inserted for dispensing soil treating fluid into the soil, said injector pipe being of sufficient length corresponding with the depth to which the soil is to be treated, first sealing means on the injector pipe for preventing soil treating fluid from flowing upwardly along the injector pipe when the soil treating fluid is being dispensed, second sealing means for sealing the surface of the soil area adjacent the injector pipe after insertion thereof into the soil, means on the vehicle for forcing the injector pipe into the soil to be treated in a series of intermittent steps, and means for selectively terminating application of soil treating fluid under pressure from said injector pipe during periods of motion of said injector pipe into the soil.

(References on following page)

References Cited

UNITED STATES PATENTS

| | | | |
|---|---|---|---|
| 3,071,200 | 1/1963 | Kuhl | 175—207X |
| 2,196,211 | 4/1940 | Hartman | 61—36X |
| 2,177,792 | 10/1939 | Taylor | 111—7.4X |
| 2,403,643 | 7/1946 | Dresser | 61—36X |
| 2,619,055 | 11/1952 | Abel et al. | 111—7.4X |
| 3,026,877 | 3/1962 | Cunningham | 111—7.1X |
| 3,243,962 | 4/1966 | Ratliff | 61—36X |

FOREIGN PATENTS

| | | | |
|---|---|---|---|
| 415,326 | 1934 | Great Britain | 61—36X |
| 709,708 | 1954 | Great Britain | 111—7.1X |

JACOB SHAPIRO, Primary Examiner

U.S. Cl. X.R.

61—36; 47—48.5, 57.5; 111—7, 7.1, 7.4